United States Patent
Takemoto

(10) Patent No.: US 7,076,119 B2
(45) Date of Patent: Jul. 11, 2006

(54) METHOD, APPARATUS, AND PROGRAM FOR IMAGE PROCESSING

(75) Inventor: Fumito Takemoto, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 710 days.

(21) Appl. No.: 10/251,989

(22) Filed: Sep. 23, 2002

(65) Prior Publication Data

US 2003/0058349 A1    Mar. 27, 2003

(30) Foreign Application Priority Data

Sep. 26, 2001    (JP) .............................. 2001-294416

(51) Int. Cl.
G06K 9/20    (2006.01)
G06K 7/00    (2006.01)

(52) U.S. Cl. ...................... 382/312; 382/274; 382/167; 382/348; 382/222.1; 382/333.02

(58) Field of Classification Search ................ 382/167, 382/274, 312, 225, 181, 240, 165, 128; 358/1.9, 358/302, 462, 462.1; 348/371, 362, 333.02, 348/143, 222.1, 231.3; 700/17, 83
See application file for complete search history.

(56) References Cited

U.S. PATENT DOCUMENTS

| | | | | |
|---|---|---|---|---|
| 5,023,565 A | * | 6/1991 | Lieu ........................... | 330/151 |
| 5,335,072 A | * | 8/1994 | Tanaka et al. ........... | 348/231.3 |
| 6,678,420 B1 | * | 1/2004 | Takeo et al. ................ | 382/240 |
| 6,810,155 B1 | * | 10/2004 | Ting et al. ................... | 382/300 |
| 6,888,962 B1 | * | 5/2005 | Sonoda et al. .............. | 382/165 |
| 2003/0002870 A1 | * | 1/2003 | Baron ......................... | 396/147 |

FOREIGN PATENT DOCUMENTS

JP        11-220687        8/1999

* cited by examiner

Primary Examiner—Jingge Wu
Assistant Examiner—Ali Bayat
(74) Attorney, Agent, or Firm—Sughrue Mion, PLLC

(57) ABSTRACT

Tag information that accompanies image data obtained by a digital camera is used efficiently and a high-quality image is reproduced. An image processing apparatus comprises a first color conversion unit for correcting a characteristic caused by the model of the digital camera by using an input device profile selected from memory according to digital camera model information and flash ON/OFF information included in the tag information, an image processing unit for judging a scene represented by the image data based on subject brightness information, subject distance information, and the flash ON/OFF information included in the tag information and for carrying out image processing by using an image processing condition set according to the scene, and a second color conversion unit for inferring an image type based on photographer information included in the tag information and for carrying out color reproduction processing according to the image type.

15 Claims, 7 Drawing Sheets

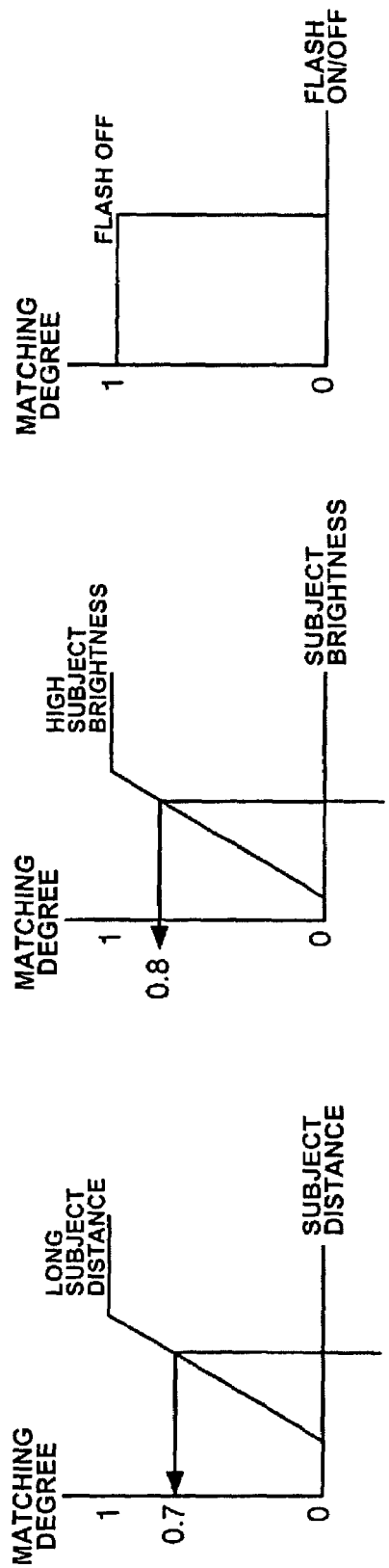

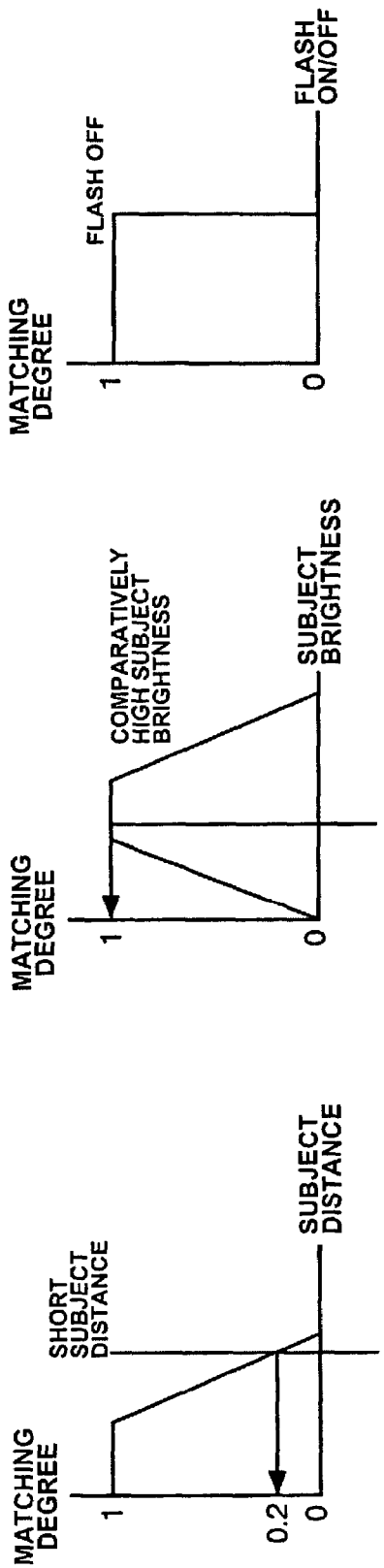

METHOD, APPARATUS, AND PROGRAM FOR IMAGE PROCESSING

BACKGROUND OF THE INVENTION

1. Field of the Invention

The present invention relates to an image processing method and an image processing apparatus for carrying out image processing on image data obtained by a digital camera. The present invention also relates to a program that causes a computer to execute the image processing method.

2. Description of the Related Art

An image obtained by photography with a digital electronic still camera (hereinafter referred to as a digital camera) can be recorded as digital image data in a recording medium such as an internal memory built in to the digital camera or an IC card. The image can then be displayed by using a printer or a monitor, based on the image data that have been recorded. In the case of printing an image obtained by a digital camera in the above manner, the image is expected to have as high a quality as a photograph printed from a negative film.

A digital camera comprises elements such as an optical system (a lens diaphragm, a shutter, a flash, and the like), an imaging system (such as CCDs and a signal processing unit), a control system (for AE, AWB, and AF), and a recording/reproducing system (for compression/decompression, memory control, and display). As factors affecting a quality of an image to be reproduced, color temperature of the flash, AE (Automatic Exposure) processing, AWB (Automatic White Balance) processing, a color filter for CCD color separation, the number of pixels, tone conversion, and a matrix operation for obtaining brightness/color difference signals can be listed, in addition to performance of the lens. In a digital camera, these factors are controlled to obtain image data that enable reproduction of a high-quality image.

Meanwhile, by using a printer or a monitor, a photographer himself/herself can freely print or display an image he/she photographed with a digital camera, without involving a DPE store. However, in order to obtain a print of sufficient quality, correction is necessary after printing or displaying image data. Consequently, this operation becomes considerably troublesome and inefficient if a large amount of prints are generated. For this reason, users wish to obtain high-quality prints by requesting printing of images obtained by digital cameras from DPE stores, as in the case of conventional prints generated from negative films.

However, the factors affecting the quality of are produced image varies, depending on a manufacturer or a model of a digital camera. Therefore, in order to reproduce a high-quality print, a DPE store needs to carry out printing while considering a characteristic of each digital camera of a specific model, since the DPE store generates prints from image data obtained by digital cameras of various models. For this reason, a system for obtaining a high-quality print has been proposed (Japanese Unexamined Patent Publication No. 11 (1999)-220687). In this system, the model of a digital camera is judged from tag information recorded by the digital camera, and image processing is carried out on image data by using an image processing condition that varies in accordance with the digital camera model. In this manner, a high-quality print can be obtained, regardless of a digital camera model.

In the system described above, at the time of carrying out the image processing on image data obtained by a digital camera, camera model information regarding the digital camera is obtained from the tag information accompanied by the image data, and the image processing condition appropriate for the model is read from a storage apparatus. The tag information includes not only the camera model information but also various kinds of information that is useful for image processing. However, the system described above carries out the image processing without sufficient use of the information. A method of setting the image processing condition that is obtained by the system based on statistic information of the image data is also described in Japanese Unexamined Patent Publication No. 11(1999)-220687. However, the image processing condition set according to the statistic information is a result of inference and not highly reliable.

SUMMARY OF THE INVENTION

The present invention has been conceived based on consideration of the above circumstances. An object of the present invention is therefore to provide an image processing method and an image processing apparatus that make sufficient use of tag information accompanied by image data obtained by a digital camera and carry out highly reliable image processing to generate a high-quality print. The present invention also provides a program that causes a computer to execute the image processing method.

An image processing method of the present invention comprises the steps of:

obtaining tag information accompanied by image data obtained by a digital camera, when image processing is carried out on the image data;

judging a scene represented by the image data, based on the tag information;

setting an image processing condition in accordance with the scene; and carrying out the image processing on the image data, based on the image processing condition that has been set.

The tag information is information accompanied by image data obtained by a digital camera, and "Baseline TIFF Rev. 6.0 ORGB Full Color Image" can be used as a standard therefor, which is adopted for a non-compressed Exif file.

As the image processing condition, a value for correcting a tone, density or a color of the image data can be used, for example. However, the image processing condition is not necessarily limited to these examples.

The scene refers to a target of photography or a combination of the target and a photography condition such as lighting. For example, scenery, portrait in fine weather, portrait in cloudy weather, and indoor portrait can be listed as the scene.

As a method of judging the scene, a fuzzy inference method can be used.

In order to improve reliability, it is preferable for the scene to be judged based on at least signal processing condition information representing signal processing carried out on the image data in the digital camera, subject distance information, and subject brightness information, among the information included in the tag information.

The signal processing carried out on the image data in the digital camera refers to signal processing carried out on an original image (an image without signal processing) obtained by photography of a subject with the digital camera. The signal processing is carried out in order to obtain a high-quality reproduction image by controlling the above-described factors such as a color temperature of the flash, AE processing, AWB processing, a color filter for CCD color separation, the number of pixels, a matrix operation for obtaining the brightness/color difference signals. The signal processing varies, depending on a mode of lighting, sensitivity, and whether or not the flash is used, for example. The conditions such as flash ON/OFF, the mode of lighting, and the sensitivity are included as conditions for the signal processing.

As the mode of lighting, automatic mode, fine weather, cloudy weather, fluorescent light, and tungsten light can be used, for example. The sensitivity refers to a degree of tone correction processing for reducing noise carried out in the digital camera, and is defined by ISO 100, for example.

An input device profile is preferably selected in accordance with the model of the digital camera and the conditions of the signal processing with reference to camera model information representing the digital camera model and the signal processing condition information included in the tag information so that pre-processing for canceling a characteristic attributed to the model of the digital camera is carried out on the image data, based on the selected input device profile. In this manner, the image processing is carried out after canceling an effect of the digital camera model characteristic.

The input device profile refers to conversion data for correcting the characteristic attributed to the model of the digital camera (such as a characteristic of a tone, a color and density). By applying the conversion data to the image data, the image data independent from the digital camera model (that is, the image data representing the original image) can be obtained. Furthermore, the conversion data can be obtained by inverting the input and output of the data representing the characteristic of the digital camera model. Therefore, the data representing the characteristic of the digital camera model may be used as the input device profile.

An image processing apparatus of the present invention is an apparatus for carrying out image processing on image data obtained by a digital camera, and the image processing apparatus comprises:

tag information input means for obtaining tag information accompanied by the image data;

scene judgment means for judging a scene represented by the image data, based on the tag information;

image processing condition setting means for setting an image processing condition in accordance with the scene; and image processing means for carrying out the image processing on the image data, based on the image processing condition that has been set by the image processing condition setting means.

In order to improve reliability of the image processing condition, the scene judgment means preferably judges the scene represented by the image data, based on at least signal processing condition information representing signal processing carried out on the image data in the digital camera, subject distance information, and subject brightness information, all of which are included in the tag information.

It is preferable for the signal processing condition information to include at least one of flash ON/OFF information, lighting mode information, and sensitivity information.

The image processing apparatus of the present invention may further comprise pre-processing means for selecting an input device profile in accordance with a signal processing condition and a digital camera model with reference to digital camera model information and the signal processing condition information included in the tag information, and for carrying out pre-processing for canceling a characteristic of the digital camera model on the image data, by using the selected input device profile. In this case, the image processing means of the image processing apparatus of the present invention carries out the image processing on the image data that have been subjected to the pre-processing carried out by the pre-processing means.

The image processing apparatus of the present invention may further comprise post-processing means for carrying out post-processing in accordance with a type of an image represented by the image data, on the image data that have been subjected to the image processing. In this case, the post-processing means selects an output profile in accordance with the type of the image, and carries out the post-processing based on the output profile that has been selected.

The type of image is the type of a target of photography, and refers to scenery, portrait, and CG (Computer Graphics), for example. The post-processing is finishing processing in accordance with the type of image, and is carried out on the image data after the image processing. The post-processing aims at reproduction of a more preferable print. For example, color reproduction is listed as a target of the post-processing, and a Perceptual method emphasizing tones is preferably used for an image representing a natural object. On the other hand, for CG, an Absolute method emphasizing hues is preferably used. The output profile refers to conversion data for carrying out the method of the post-processing.

The post-processing means is preferably capable of determining the type of image based on photographer information. In other words, the type of image is inferred and determined based on a photographer, since each photographer, especially in the case of a professional photographer, often has a specific target of photography. In this manner, a service of image processing can be improved.

It is also preferable for the photographer information to be included in the tag information.

A program of the present invention is a program for carrying out image processing on image data obtained by a digital camera, and the program causes a computer to execute the procedures of judging a scene represented by the image data with reference to tag information accompanied by the image data, setting an image processing condition in accordance with the scene, and carrying out the image processing on the image data in accordance with the image processing condition that has been set.

The computer refers to not only an ordinary computer such as a desktop PC but also a chip that operates according to instructions by the program.

According to the image processing method, the image processing apparatus of the present invention, and a computer having the program of the present invention installed therein, a scene represented by image data obtained by a digital camera is judged based on tag information accompanied by the image data, and image processing is carried out according to an image processing condition that is set in accordance with the scene. Therefore, the tag information is used efficiently, and reliability of the image processing condition can be improved. In this manner, a high-quality reproduction image can be obtained.

Furthermore, the image processing can be carried out after pre-processing for canceling a characteristic caused by a digital camera model is carried out. Therefore, images can be reproduced in uniformly high quality, regardless of the model of digital camera.

Moreover, post-processing in accordance with an image type can be carried out on the image data after the image processing. In this manner, an image can be reproduced in higher quality.

By judging the image type according to a photographer, the post-processing according to the photographer can also be carried out, resulting in a better service.

BRIEF DESCRIPTION OF THE DRAWINGS

FIGS. 6A to 6C are diagrams showing the operation of a scene judgment unit 42.

DESCRIPTION OF THE PREFERRED EMBODIMENT

Hereinafter, an embodiment of the present invention will be explained with reference to the accompanying drawings.

Figure 1:
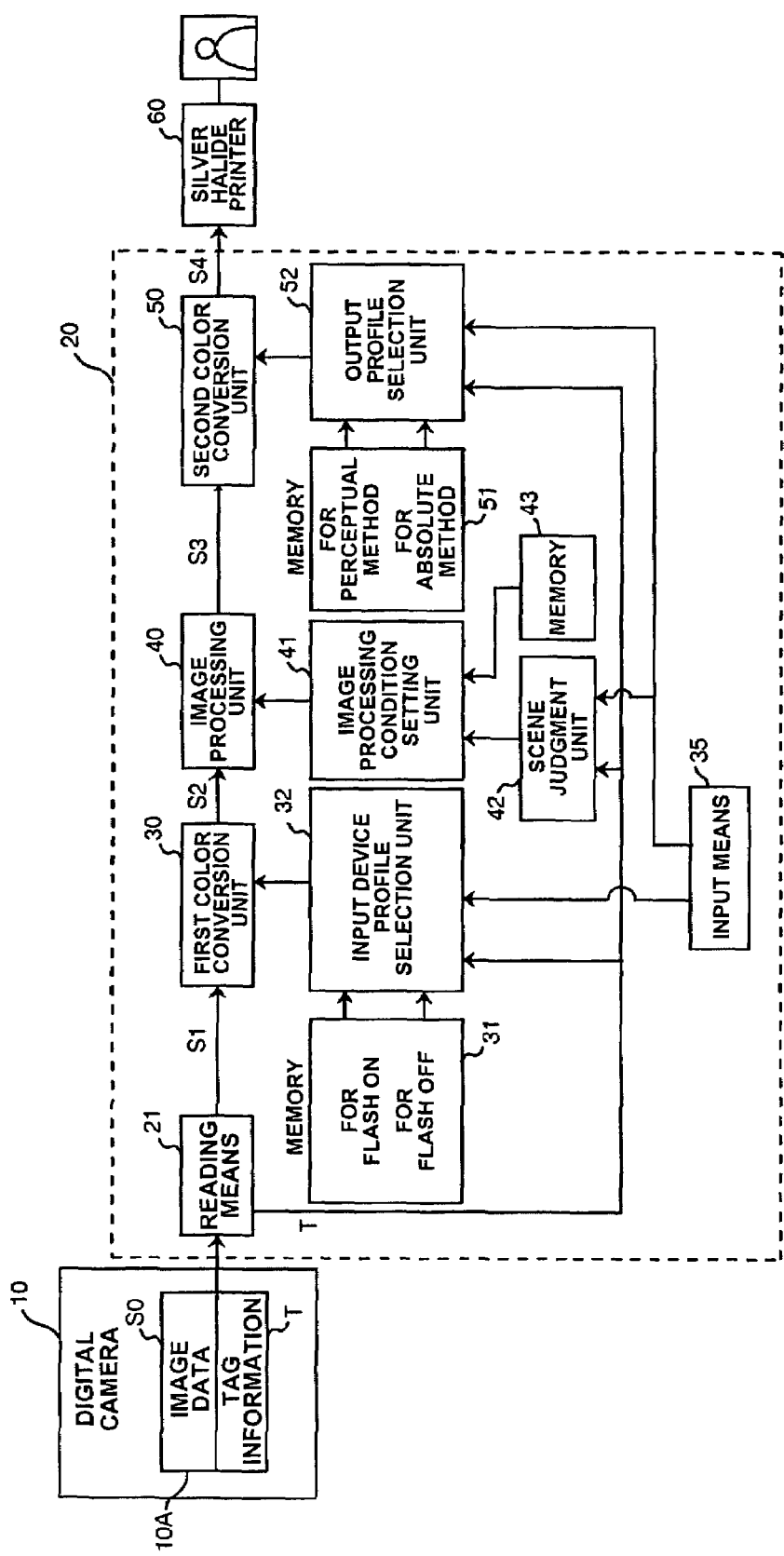
FIG. 1 is a block diagram showing a configuration of an image processing apparatus of an embodiment of the present invention.

FIG. 1 is a block diagram showing a configuration of an image processing apparatus of an embodiment of the present invention. As shown in FIG. 1, an image processing apparatus 20 of this embodiment is used for obtaining a print that is output from a silver salt printer 60. The image processing apparatus 20 reads image data S0 obtained by photography of a subject with a digital camera 10 and tag information T, and carries out various kinds of image processing on the image data S0 by using the tag information T. As shown in FIG. 1, the image processing apparatus 20 comprises reading means 21 for reading the image data S0 and the tag information T obtained by the digital camera 10 and for obtaining image data S1 comprising color data R1, G1, and B1 by decompressing the image data S0 which were compressed at the time of photography, a first color conversion unit 30 for logarithmically converting the image data S1 and for obtaining image data S2 independent from a camera model characteristic of the digital camera 10 by canceling the camera model characteristic expressed in the image data S1, an image processing unit 40 for obtaining processed image data S3 by carrying out image processing such as density correction, color correction, and tone correction on the image data S2, and a second color conversion unit 50 for obtaining image data S4 by carrying out color reproduction processing on the processed image data S3 in accordance with a type of an image represented by the processed image data S3 and for outputting the image data S4 to the silver halide printer 60. The first color conversion unit 30, the image processing unit 40, and the second color conversion unit 50 are respectively connected to an input device profile selection unit 32, an image processing condition setting unit 41, and an output profile selection unit 52. An input device profile selected by the input device profile selection unit 32, image processing conditions set by the image processing condition setting unit 41, and an output profile selected by the output profile selection unit 52 are used for the various kinds of image processing.

For the case where the tag information T does not include camera model information regarding the digital camera 10, signal processing condition information (such as flash ON/OFF information), subject distance information, or subject brightness information, or for the case where an operator of the image processing apparatus 20 wishes to manually input the information described above, the image processing apparatus 20 further comprises input means 35 for inputting the various kinds of information to the input device profile selection unit 32, the scene judgment unit 42, and the output profile selection unit 52.

The image data S1 obtained by the reading means 21 are data obtained by photographing the subject with the digital camera 10, and have been subjected to AE/AWB processing and tone characteristic change processing carried out by the digital camera 10 during photography. Therefore, the image data S1 have a $\gamma$ characteristic which is not necessarily 1 for the subject.

The first color conversion unit 30 carries out the logarithmic conversion on the image data S1 comprising the color data R1, G1, and B1, and obtains the image data S2 representing logarithmic exposure of the subject by using the input device profile selected by the input device profile selection unit 32. The image data S2 obtained by the first color conversion unit 30 do not depend on the digital camera model characteristic, and thus have the tone characteristic of $\gamma=1$ for the subject. The input device profile selection unit 32 selects the input device profile for correcting the camera model characteristic of the digital camera 10 from memory 31, in accordance with the digital camera model information and the flash ON/OFF information included in the tag information T. The input device profile selection unit 32 then outputs the selected input device profile to the first color conversion unit 30. In the case where the tag information T does not include the camera model information regarding the digital camera 10, the input device profile selection unit 32 selects a default input device profile or an input device profile selected manually by the operator by using the input means 35, and outputs the selected input device profile to the first color conversion unit 30. The memory 31 stores input device profiles generated for respective digital camera models for the cases of flash ON and OFF, in addition to the default input device profile. The image processing condition setting unit 41 is connected to the scene judgment unit 42. The image processing condition setting unit 41 obtains the image processing conditions through correction of default image processing conditions such as default density correction conditions, a default tone correction condition, a default color correction condition, and a default sharpness correction condition stored in memory 43 according to manual inputs from the input means 35 and then according to the scene represented by the image data that is judged by the scene judgment unit 42. The image processing condition setting unit 41 then outputs the image processing conditions obtained in the above manner to the image processing unit 40. The default image processing conditions may be set for the image data S2, by analyzing the image data S2. For example, the default density correction conditions may be determined based on average RGB densities of an entire image represented by the image data S2 that are output as RGB density signals, or based on RGB densities of the lowest 1% (on the highlight side) of a cumulative histogram thereof. The input means 35 comprises DCMY keys for respectively changing densities of D (the entire image), C (Cyan), M (Magenta), and Y (Yellow), and the densities can be adjusted as a user wishes, by using the DCMY keys.

The scene judgment unit 42 judges the scene represented by the image data, based on the flash ON/OFF information, the subject brightness information, and the subject distance information included in the tag information Tread by the reading means 21. The operation of the scene judgment unit 42 will be explained later in detail.

Figure 2:
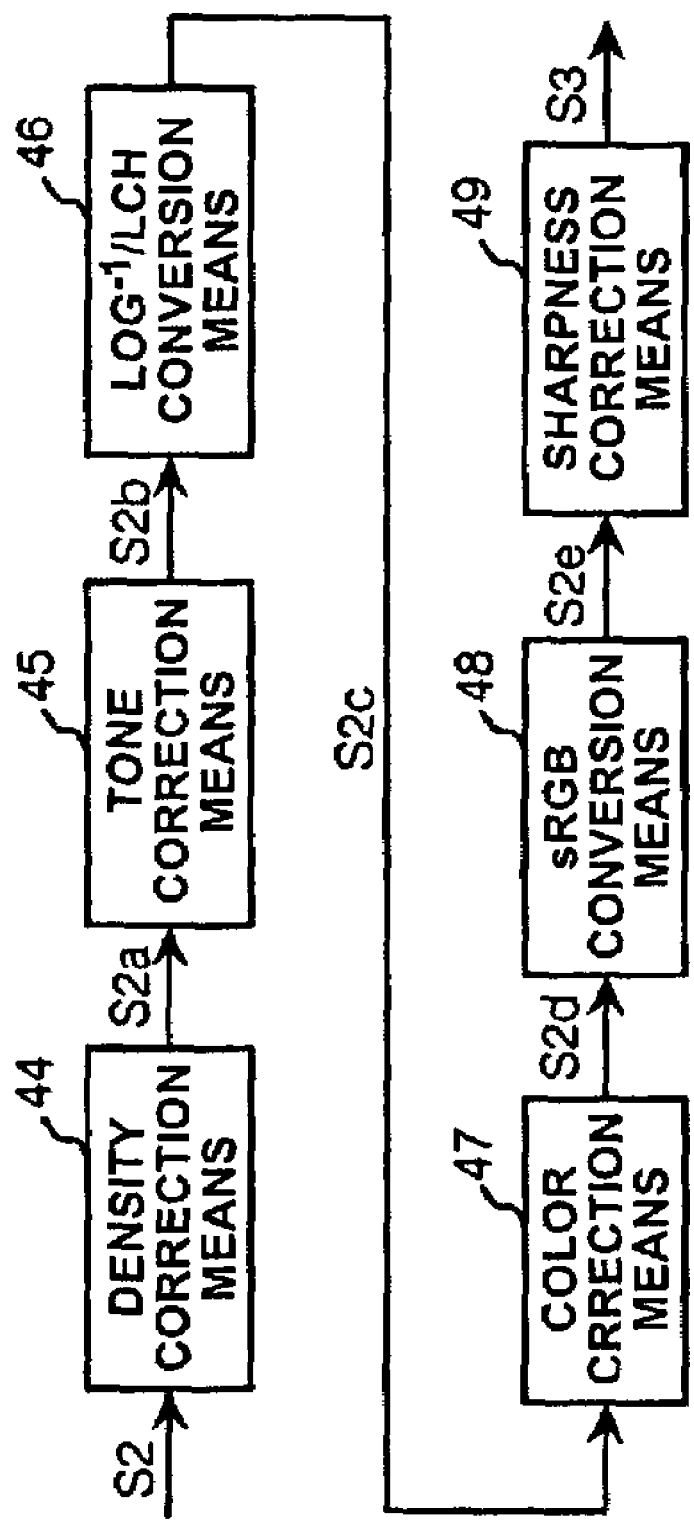
FIG. 2 is a block diagram showing a configuration of an image processing unit 40 in the image processing apparatus shown in FIG. 1.

The image processing unit 40 carries out the image processing based on the image processing conditions set by the image processing condition setting unit 41. A configuration of the image processing unit 40 is shown by a block diagram in FIG. 2. As shown in FIG. 2, the image processing unit 40 comprises density correction means 44 for obtaining image data S2a (R2a, G2a, B2a) by carrying out the density correction based on the density correction conditions set by the image processing condition setting unit 41 (that is, the density correction conditions obtained by correcting the default density correction conditions stored in the memory 43 according to the manual inputs from the input means 35 and then according to the scene), tone correction means 45 for obtaining image data S2b (R2b, G2b, B2b) by carrying out the tone correction on the image data S2a based on the tone correction condition set by the image processing condition setting unit 41, Log$^{-1}$/LCH conversion means 46 for carrying out the inverse logarithmic conversion on the image data S2b and for converting the data having been subjected to the inverse logarithmic conversion into image data S2c comprising data L2c, C2c, and H2c that represent lightness L*, chroma C*, and hue HA, color correction means 47 for obtaining image data S2d comprising color corrected data L2d, C2d, and H2d by carrying out the color correction on the data L2c, C2c, and H2c based on the color correction condition set by the image processing condition setting unit 41, sRGB conversion means 48 for obtaining color corrected image data S2e comprising color data R2e, G2e, and B2e by converting the color corrected data L2d, C2d, and H2d into an sRGB color space which is a color space for monitors, and sharpness correction means 49 for obtaining the processed image data S3 by carrying out sharpness correction processing on the color corrected image data S2e.

The density correction means 44 carries out the density correction on the image data S2 according to the following Equation (1), and obtains the image data S2a:

$$R2a = R2 + r$$
$$G2a = G2 + g \quad (1)$$
$$B2a = B2 + b$$

where r, g, and b are density correction values.

The image processing condition unit 41 obtains the density correction values r, g, and b by correcting the default density correction conditions stored in the memory 43 according to the manual input from the input means 35 and then according to the scene judged by the scene judgment unit 42.

Figure 3A:
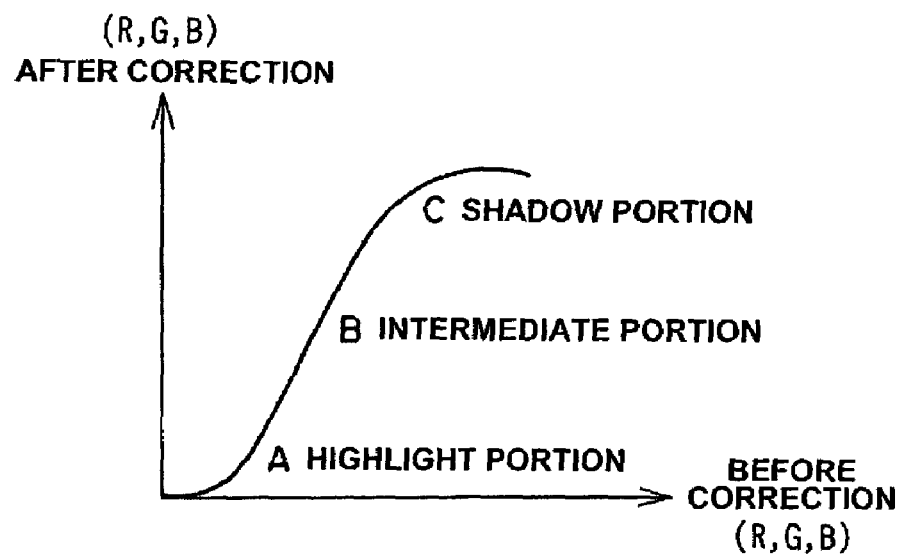
FIGS. 3A and 3B are diagrams showing the operation of tone correction means 45 in the image processing unit 40 shown in FIG. 2, and FIGS. 4A to 4C are diagrams showing the operation of a scene judgment unit 42.

The tone correction means 45 carries out the tone correction on the image data S2a whose densities have been corrected by the density correction means 44, by using the tone correction condition set by the image processing condition setting unit 41. The image processing condition setting unit 41 firstly reads the default tone correction condition stored in the memory 43. In the case of printing, the default tone correction condition usually has an S-like shape as shown by a tone conversion curve in FIG. 3A, in order to harden tones for a better impression. An intermediate portion of the curve corresponds to the case of γ=1.6. The tone conversion curve can be changed by manual input from the input means 35.

Figure 3B:
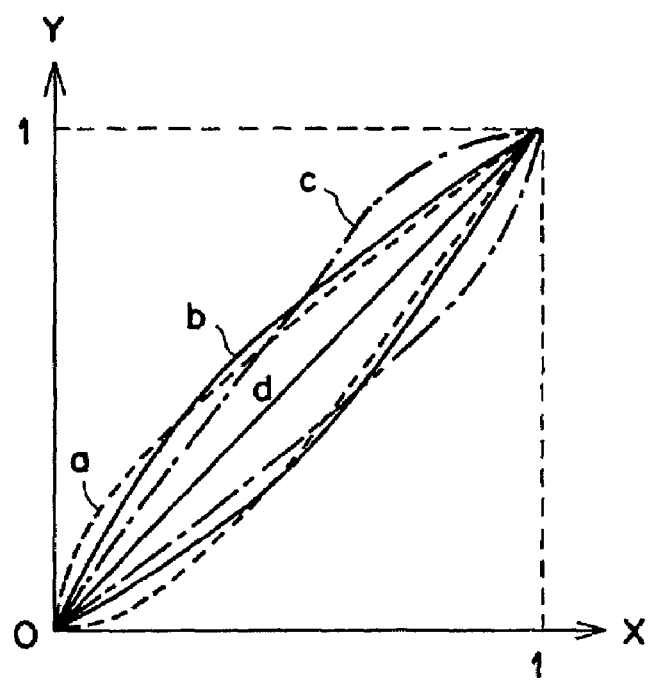

The image processing condition setting unit 41 then corrects the tone conversion curve (or the tone conversion curve corrected by the manual input from the input means 35), based on the scene judged by the scene judgment unit 42. In this embodiment, the image processing condition setting unit 41 respectively corrects a highlight portion (a portion shown by A), the intermediate portion (shown by B), and a shadow portion (shown by C) of the tone correction curve. More specifically, as shown in FIG. 3B, the highlight portion, the intermediate portion, and the shadow portion are subjected to curve fitting by using curves a, b, and c representing quadratic functions respectively having peaks in the respective portions. By correcting a coefficient that is multiplied with a difference between each of the curves a, b, and c and a line d representing Y=X, each of the portions of the curve is corrected. The case of the coefficient being 1 refers to no correction to the corresponding portion of the curve.

The image processing condition setting unit 41 sets the tone correction coefficient described above in accordance with the scene judged by the scene judgment unit 42, and corrects the tone conversion curve (that is, the tone correction condition). How the tone correction coefficient is found will be explained later.

The tone correction means 45 carries out the tone correction on the image data S2a according to the tone correction condition set by the image processing condition setting unit 41, and obtains the image data S2b. The log$^{-1}$/LCH conversion means 46 carries out the inverse logarithmic conversion on the image data S2b, and then converts the data after the inverse logarithmic conversion into the image data S2c comprising the data L2c, C2c, and H2c representing lightness L*, chroma C*, and hue HA, respectively.

The color correction means 47 carries out the color correction on the image data S2c, based on the color correction condition set by the image processing condition setting unit 41. The image processing condition setting unit 41 corrects the default color correction condition (a color correction value, in this case) stored in the memory 43 (or the color correction value that has been changed according to the manual input from the input means 35) in accordance with the scene judged by the scene judgment unit 42, and outputs the color correction value to the color correction means 47. How the image processing condition setting unit 41 corrects the color correction value according to the scene will be explained later in detail.

The sRGB conversion means 48 converts the image data S2d (L2d, C2d, H2d) that have been subjected to the color correction by the color correction means 47 into the sRGB color space which is the color space for monitors, and the color corrected image data S2e comprising the color data R2e, G2e, and B2e are obtained. The sharpness correction means 49 carries out the sharpness correction processing on the image data S2e by using the sharpness correction condition (a sharpness gain, in this case) set by the image processing condition setting unit 41, and generates the processed image data S3. The processed image data S3 are output to the second color conversion unit 50. The image processing condition setting unit 41 corrects the default sharpness correction condition (gain) stored in the memory 43 (or the sharpness gain obtained by correcting the default sharpness gain according to the manual input from the input means 35) in accordance with the scene judged by the scene judgment unit 42, and provides the sharpness gain to the sharpness correction means 47. How the sharpness gain is corrected according to the scene will be explained later in detail. The output profile selection unit 52 infers the type (such as scenery or CG) of image based on photographer information included in the tag information T, and determines a method of color reproduction processing in accordance with the type of image. The output profile selection unit 52 selects from memory 51 the output profile for realizing the color reproduction method, such as a 3D LUT (Look-Up Table) in accordance with the color reproduction method, and outputs the selected output profile to the second color conversion unit 50. The output profile is generated according to a type of an output device and the type of image. The memory 51 stores 3D LUTs for a perceptual method and for an absolute method.

The second color conversion unit 50 converts the processed image data S3 that are the sRGB data output from the image processing unit 40 into a device signal for the printer 60, that is, into the image data S4 to be output, by using the output profile selected by the output profile selection unit 52.

The reading means 21 of the image processing apparatus 20 is used for reading the image data S0 and the tag information T. In the case where the image data S0 and the tag information T are recorded in a recording medium such as a memory card or a floppy disc, the reading means 21 reads the image data S0 and the tag information T from the recording medium. Alternatively, the image data and the tag information may be sent to the reading means 21 via a network.

The operation of the image processing apparatus 20 will be explained in detail, mainly on the operation of the scene judgment unit 42 and the image processing condition setting unit 41.

The image data S0 are obtained by photographing the subject with the digital camera 10 and recorded in a recording medium 10A together with the tag information T including the camera model information regarding the digital camera 10, the flash ON/OFF information, the subject brightness information, the subject distance information, and the photographer information. The reading means 21 of the image processing apparatus 20 reads the image data S0 that were compressed at the time of recording and the tag information T from the recording medium 10A, and inputs the image data S1 generated by decompression of the image data S0 to the first color conversion unit 30. The reading means 21 also outputs the tag information T to the input device profile selection unit 32, to the scene judgment unit 42, and to the output profile selection unit 52.

The input device profile selection unit 32 selects the input device profile for correcting the camera model characteristic (regarding densities, tones, and colors, for example) of the digital camera 10 from the memory 31 storing the input device profiles for the cases of using and not using the flash of respective camera models, based on the camera model information and the flash ON/OFF information included in the tag information T. The input device profile selection unit 32 outputs the selected input device profile to the first color conversion unit 30. The input device profile refers to conversion data for correcting the camera model characteristic of the digital camera 10, and includes a value for correcting the tone characteristic of the digital camera 10 and a color correction value for correcting a color characteristic of the digital camera 10, for example.

The image data S1 are according to the ITU-R BT. 709 (REC. 709) standard, and the first color conversion unit 30 carries out the tone correction on the image data S1 by using the input device profile selected by the input device profile selection unit 32. In this manner, the tone characteristic caused by the model of the digital camera 10 is canceled, and the image data S2 not affected by the tone characteristic of the digital camera 10 are output to the image processing unit 40.

The image processing unit 40 carries out the image processing on the image data S2 by using the image processing conditions set by the image processing condition setting unit 41 (such as the density correction conditions, the tone correction condition, and the color correction condition), and generates the processed image data S3. The image processing condition setting unit 41 sets the image processing conditions according to the scene judged by the scene judgment unit 42. In this embodiment, the scene refers to scenery, portrait in fine weather, portrait in cloudy weather, indoor portrait, or unknown. The scene is judged according to the following rules, for example.

1. The scene is judged to be scenery if the subject distance is long, and if the subject brightness is high, in addition to the condition of flash OFF.

2. The scene is judged to be portrait in fine weather if the subject distance is short, and if the subject brightness is high, in addition to the condition of flash OFF.

3. The scene is judged to be portrait in cloudy weather if the subject distance is short, and if the subject brightness is comparatively high, in addition to the condition of flash OFF.

4. The scene is judged to be indoor portrait if the subject distance is short, and if the subject brightness is low, in addition to the condition of flash ON.

5. The scene is judged to be unknown if none of the above cases are applied to.

Membership functions corresponding to the rules (excluding rule 5) are prepared, as shown in FIGS. 4 to 7. The scene judgment unit 42 finds a value representing a degree of matching between the scene represented by the image data S0 and the scene (scenery, portrait in fine weather, portrait in cloudy weather, indoor portrait) set according to each of the above rules 1 to 4, based on a fuzzy inference method using the membership functions shown in FIGS. 4 to 7 as well as the subject distance information, the subject brightness information, and the flash ON/OFF information included in the tag information T. The operation of the scene judgment unit 42 will be explained in detail with reference to examples shown in FIGS. 4 to 7.

The degree of matching between the scene represented by the image data S0 and the scene representing scenery, for example, can be found from the functions shown in FIGS. 4A to 4C, based on the subject distance information, the subject brightness information, and the flash ON/OFF information included in the tag information T of the image data S0. The image data S0 shown in the examples in FIGS. 4A to 4C have the matching degrees of 0.7, 0.8, and 1.0 with the scene representing scenery (the values are shown by arrows in FIG. 4), for the subject distance, for the subject brightness, and for the use/non-use of flash, respectively. The minimum value is found from these values, and used as the degree of matching with the scenery. In the examples shown in FIG. 4, the matching degree is 0.7 that is the minimum among the values described above.

Figures 5A, 5B, 5C:
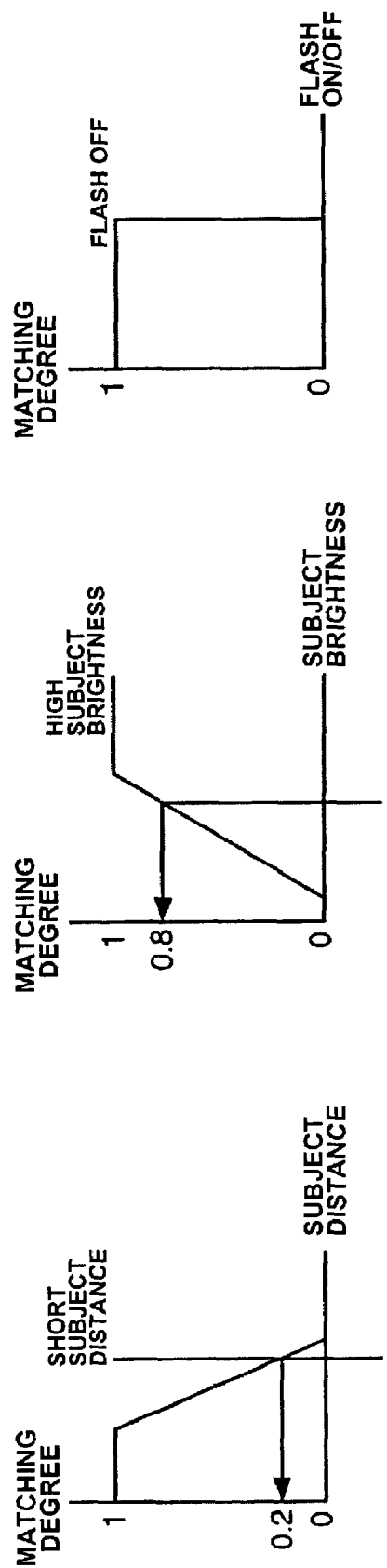
FIGS. 5A to 5C are diagrams showing the operation of a scene judgment unit 42.
Figure 7A:
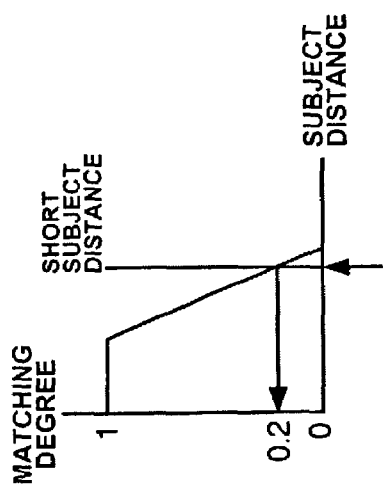
FIGS. 7A to 7C are diagrams showing the operation of a scene judgment unit 42.
Figure 7B:
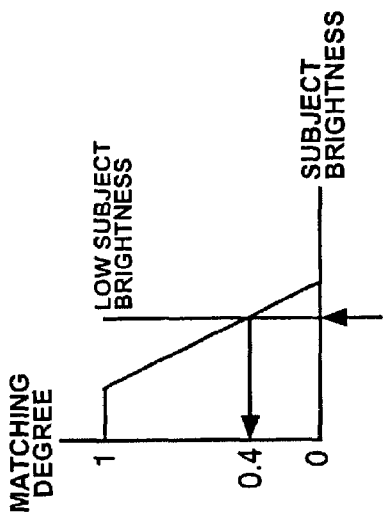
Figure 7C:
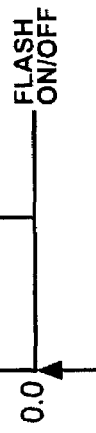

Likewise, the degrees of matching are found for portrait in fine weather, portrait in cloudy weather, and indoor portrait, by using FIGS. 5 to 7. The degrees of matching for these cases (scenes) shown in FIGS. 5 to 7 are 0.2, 0.2, and 0.0, respectively.

The degrees of matching are subjected to normalization to cause the sum of the above-described matching degrees to become 1, and the values representing the degrees of matching for the respective scenes are found (hereinafter, the degrees of matching are referred to as M1, M2, M3, and M4):

$$M1=0.7/(0.7+0.2+0.2+0.0)=0.636$$

$$M2=0.2/(0.7+0.2+0.2+0.0)=0.182$$

$$M3=0.2/(0.7+0.2+0.2+0.0)=0.182$$

$$M4=0.0/(0.7+0.2+0.2+0.0)=0.0$$

After the degrees of matching are found for the respective scenes, the scene judgment unit 42 outputs information representing the degrees of matching to the image processing condition setting unit 41.

The image processing condition setting unit 41 can correct the default image processing conditions, that is, the default density correction conditions, the default tone correction condition, the default color correction condition, and the default sharpness correction condition (or the image processing conditions generated by changing the default image processing conditions according to the inputs from the input means 35) according to the following rules:

1. For scenery: add 0.5, 0.5, 5, and 2 to the correction coefficient for highlight tones, the correction coefficient for intermediate tones, a correction value for chroma (the color correction condition), and a correction value for the sharpness gain 2. For portrait in fine weather: add −0.5 and 0.5 to the correction coefficient for intermediate tones and to the correction value for the sharpness gain 3. For portrait in cloudy weather: add −0.5, 0.5, and −1 to the correction coefficient for highlight tones, the correction coefficient for intermediate tones, and to the correction value for the sharpness gain 4. For indoor portrait: add 0.5, 2, and −1 to the correction coefficient for highlight tones, the correction values for densities, and the correction value for the sharpness gain.

For the case of unknown scene, no correction is carried out.

The image processing condition setting unit 41 calculates the image processing conditions for the image data S2 according to the following Equation (2), by using the matching degrees regarding the scene represented by the image data S0 output from the scene judgment unit 42:

The correction coefficient for highlight tones=$M1*0.5+M3*(−0.5)+M4*0.5$

The correction coefficient for intermediate tones=$M1*0.5+M2*(−0.5)+M3*0.5$

The correction value for chroma=$M1*5$ (2)

The correction value for sharpness gain=$M1*2+M2*(−1)+M3*(−1)+M4*(−1)$

The correction values for densities=$M4*2$

The highlight tone correction coefficient, the intermediate tone correction coefficient, the chroma correction value, the sharpness gain correction value, and the density correction value are found for the image data S2 shown in FIGS. 5 to 7 whose values of M1, M2, M3, and M4 are 0.636, 0.182, 0.182, and 0.0. The correction values found in this manner are 0.227, 0.318, 3.18, 0.908, and 0.0.

The image processing condition setting unit 41 outputs the correction values found in the above manner to the image processing unit 40, and the image processing unit 40 carries out the image processing on the image data S2 by using the correction values. In this manner, the processed image data S3 are obtained. The image processing condition setting unit 41 outputs the tone correction condition to the tone correction means 45 of the image processing unit 40 by adding 1 to the correction coefficients found in the above manner. The image data S3 comprise the color data R3, G3, and B3 in the SRGB color space that is the color space for monitors.

The second color conversion unit 50 is used for obtaining the image data S4 to be printed, by converting the image data S3 comprising the color data R3, C3, and B3 into a color space for the silver halide printer 60. In the case where the printer 60 prints the image data obtained by the digital camera 10, color reproducibility changes, depending on a material used for printing the image data. For this reason, it is preferable for the color reproducibility to be optimized according to a combination of the image data and the printing material used by the printer 60. The second color conversion unit 50 of the image processing apparatus 20 of this embodiment is used for optimizing the color reproducibility. As the method for reproducing colors, a perceptual method emphasizing tones and an absolute method emphasizing hues can be listed, which is not limited to these two methods.

The second color conversion unit 50 carries out color conversion on the image data S3 by using the output profile selected by the output profile selection unit 52. The output profile selection unit 52 judges the type of image (such as scenery or CG, or a portrait) based on the photographer information included in the tag information T, since each photographer, especially a professional photographer, has a specific photography target. The output profile selection unit 52 selects the output profile in accordance with the image type from the memory 51 and outputs the output profile to the second color conversion unit 50.

The image data after the color conversion by the second color conversion unit 50 are used as the image data S4 for printing, and printed by the printer 60 to generate a print.

The processing describe above can be carried out based on information input manually from the input means 35.

As has been described above, the scene represented by the image data is judged based on the tag information accompanied by the image data obtained by the digital camera, and the image processing is carried out by setting the image processing conditions according to the scene. Therefore, the tag information is used efficiently, and reliability of the image processing conditions can be improved, resulting in a higher-quality reproduction image.

Furthermore, since the image processing can be carried out after the first color conversion unit carries out pre-processing to absorb the characteristic of camera model. Therefore, regardless of the model of the digital camera, a uniformly high-quality image can be reproduced.

By carrying out post processing for color reproduction by using the second color conversion unit according to the type of image, the quality of reproduced image can become higher.

Since the type of image is judged according to a photographer, the post processing can be carried out according to the photographer, leading to a better service.

Although the embodiment of the image processing apparatus of the present invention has been described above, the present invention is not limited to the above embodiment. Within the scope of the invention, various modifications can be made thereto.

For example, in the above embodiment, the image processing is carried out by the image processing unit 40 after the color conversion is carried out on the image data S1 by the first color conversion unit. However, instead of carrying out the pre-processing by the first color conversion unit, the input device profile and the image processing conditions may be selected and set by the input device profile selection unit 32 and the image processing condition setting unit 41 so that the color conversion for canceling the characteristic of the digital camera is carried out at the same time of carrying out the image processing, based on combination of the image processing conditions and the selected input device profile.

Moreover, in the above image processing apparatus, only the flash ON/OFF information is used as a signal processing condition. However, lighting mode information and sensitivity information may be used as a portion of the tag information to be used for the image processing.

A skilled artisan would know that computer readable media is not limited to any specific type of storage device and includes any kind of device, including but not limited to CDs, floppy discs, RAMs, ROMs, hard discs, magnetic tapes, and internet downloads, in which computer instructions can be stored and/or transmitted. Transmission of the computer code through a network or through wireless transmission means is also within the scope of this invention. Additionally, computer code/instructions include, but are not limited to, source, object, and executable code and can be in any language including higher level languages, assembly language and machine language.

What is claimed is:

1. An image processing method for carrying out image processing on image data obtained by a digital camera, the method comprising:
   obtaining tag information that accompanies the image data;
   judging a scene represented by the image data, based on the tag information;
   setting an image processing condition in accordance with the scene;
   pre-processing on the image data for canceling a characteristic attributed to a digital camera model according to a selected input device profile, and
   carrying out the image processing on the image data, based on the image processing condition that has been set.

2. An image processing method as defined in claim 1, wherein the step of judging the scene is based on the tag information by using a fuzzy inference method.

3. An image processing method as defined in claim 1 or 2, wherein the step of judging the scene based on at least signal processing condition information representing signal processing carried out on the image data in the digital camera, subject distance information, and subject brightness information, all of which being included in the tag information.

4. An image processing method as defined in claim 3, further comprising:
   selecting an input device profile in accordance with a model of the digital camera and a condition of the signal processing, based on camera model information regarding the digital camera and the signal processing condition information, both of which being included in the tag information.

5. An image processing method as defined in claim 1, wherein the tag information comprises the model of the digital camera.

6. An image processing apparatus for carrying out image processing on image data obtained by a digital camera, comprising:
   tag information input means for obtaining tag information that accompanies the image data;
   scene judgment means for judging a scene represented by the image data, based on the tag information;
   image processing condition setting means for setting an image processing condition in accordance with the scene;
   pre-processing means for canceling a characteristic attributed to a digital camera model according to a selected input device profile in the image data, and
   image processing means for carrying out the image processing on the image data, based on the image processing condition that has been set by the image processing condition setting means.

7. An image processing apparatus as defined in claim 6, wherein the scene judgment means judges the scene according to the tag information by using a fuzzy inference method.

8. An image processing apparatus as defined in claim 6 or 7, wherein the scene judgment means judges the scene represented by the image data, based on at least signal processing condition information representing signal processing carried out on the image data in the digital camera, subject distance information, and subject brightness information, all of which being included in the tag information.

9. An image processing apparatus as defined in claim 8, wherein the signal processing condition information includes at least one of flash ON/OFF information, lighting mode information, and sensitivity information.

10. An image processing apparatus as defined in claim 8, wherein
    the pre-processing means selects an input device profile in accordance with the model of the digital camera model and a condition of the signal processing with reference to digital camera model information and the signal processing condition information included in the tag information, and carries out the pre-processing on the image data, by using the selected input device profile and
    the image processing means carries out the image processing on the image data that have been subjected to the pre-processing carried out by the pre-processing means.

11. An image processing apparatus as defined in claim 6, further comprising: post-processing means for carrying out post-processing in accordance with a type of an image represented by the image data, on the image data that have been subjected to the image processing, wherein
    the post-processing means selects an output profile in accordance with the type of the image, and carries out the post-processing based on the output profile that has been selected.

12. An image processing apparatus as defined in claim 11, wherein the post-processing means enables determination of the type of the image based on photographer information.

13. An image processing apparatus as defined in claim 12, wherein the photographer information is included in the tag information.

14. An image processing apparatus as defined in claim 6, wherein the tag information comprises the model of the digital camera.

15. A computer-readable recording medium storing a program for carrying out image processing on image data obtained by a digital camera, the program causing a computer to execute the procedures of:

judging a scene represented by the image data with reference to tag information that accompanies the image data;

setting an image processing condition in accordance with the scene;

pre-processing on the image data for canceling a characteristic attributed to a digital camera model according to a selected input device profile; and carrying out the image processing on the image data in accordance with the image processing condition that has been set.

\* \* \* \* \*